ELECTROSCOPE

Original Filed July 20, 1950 2 Sheets-Sheet 1

Inventors
HUGH CARMICHAEL
PERCY G. SALMON
BY- Smart + Biggar
Atty's

ELECTROSCOPE
Original Filed July 20, 1950 2 Sheets-Sheet 2
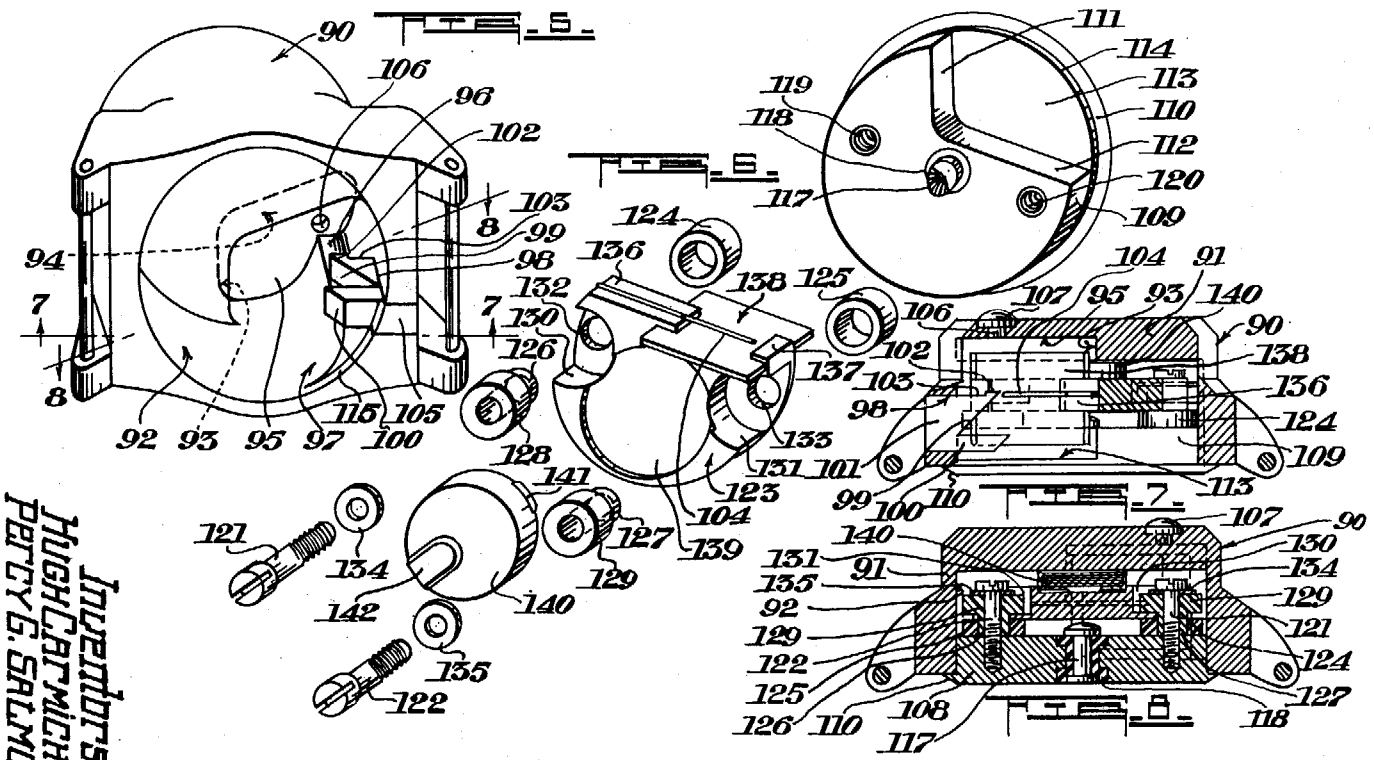
Inventors
Hugh Carmichael.
Percy G. Salmon
BY Smart & Biggar
Attys.

United States Patent Office

Re. 23,997

Reissued May 10, 1955

23,997

ELECTROSCOPE

Hugh Carmichael and Percy George Salmon, Deep River, Ontario, Canada, assignors to National Research Council, Ottawa, Ontario, Canada, a body corporate of Canada Original No. 2,677,773, dated May 4, 1954, Serial No. 174,920, July 20, 1950. Application for reissue December 8, 1954, Serial No. 474,311

Claims priority, application Great Britain March 15, 1950

15 Claims. (Cl. 250—83.3)

Figure 4:
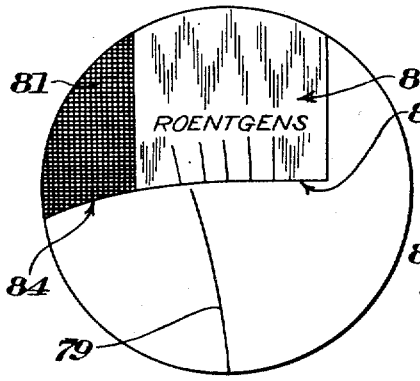

This invention is for improvements in or relating to electroscopes.

The necessity for continuously measuring the radiation affecting personnel working with radioactive materials or being otherwise exposed to penetrating radient energy or particles, has given rise to a demand for small light-weight radiation-measuring instruments which are sufficiently rugged in mechanical construction to withstand being carried continuously on the person while having an electrical sensitivity and stability of an order high enough to serve as reliable indicators under conditions of radiation dosages of the order of magnitude of 0.5 Roentgens or less, full scale, or alternatively between 0.5 and 25 Roentgens full scale or of the order of 25.0 Roentgens and upwards, full scale.

Quartz-fibre electroscopes of the type commonly coupled with the names of C. C. and T. Lauritsen and described by them in an article entitled "A Simple Quartz Fiber Electroscope" (Rev. Sci. Inst., 8, 438, 1937), have proved eminently suitable as a basis for design for instruments of the type in question in preserving the essential simplicity of the well-known gold-leaf electroscope while utilising as indicator an elastic fibre which upon deflection provides its own restoring force and yet is so thin and light as substantially to be unaffected by the force of gravity.

Various miniature electroscopes using elastic fibre indicators have become commercially available and have been put into extensive use over recent years under such names as Lauritsen electroscopes, fountain-pen electroscopes, pocket electroscopes, pocket dosimeters, portable dosimeters and so on. The miniature instruments previously available have, however, been rather costly to produce in requiring considerable skill in manufacturing assembly and adjustment to secure similar electrical characteristics in instruments of otherwise identical construction and in utilising a relatively large number of component parts, particularly in the optical system.

The invention relates to electroscopes of the types utilising an indicator fibre consisting of a fine, light, elastic electrical conductor (for example, a quartz fibre sputtered with gold) supported with an extremity free to deflect under the influence of an applied electrostatic field.

An object of the invention is to provide an improved electroscope of the type referred to having simple means for viewing and estimating the position of the indicator fibre.

A further object of the invention is to provide an electroscope particularly suited to miniaturisation, which is compact, light in weight and mechanically rugged while at the same time possessing a high order of electrical stability and a sensitivity adequate for the purpose in view.

A still further object of the invention is to provide a construction suited to mass production methods which nevertheless is capable of giving substantially constant electrical characteristics notwithstanding such minor structural variations between otherwise identical instruments as are inevitable in large scale production.

According to the invention an electroscope comprises a casing having an internal conducting surface a member having a conducting surface mounted within the casing in insulated relationship thereto, a flexible conducting indicator fibre supported adjacent to one of the said surfaces constituting a repulsion surface in electrical connection therewith, the fibre having an extremity capable of angular deflection with respect to the repulsion surface, a scale within the casing carried adjacent to the deflectable extremity of the fibre in measuring relationship to angular deflection thereof, an objective lens supported from an aperture in the casing in image-forming relationship to and spaced from the deflectable extremity of the fibre and scale by an optical distance less than its focal length, and means for illuminating the fibre and scale by light external to the casing whereby enlarged virtual images thereof may be viewed at the lens.

According to one embodiment of the invention, the window is arranged in the casing on the optical axis of the lens and the scale and indicator fibre are disposed between the lens and the window for trans-illumination from the latter.

In an alternative construction, the window is situated out of alignment with the optical axis of the lens and an optical system is provided within the casing to receive light admitted by the window and to direct it upon the scale and the deflectable extremity of the fibre. The optical system preferably comprises a prismatic reflecting system in the field of view of the lens and may conveniently include a first prismatic element upon which the scale is carried immediately adjacent to the deflectable extremity of the fibre for trans-illumination by the element, and a second prismatic element removed further from the lens than the deflectable extremity of the fibre for trans-illuminating the fibre extremity.

Stabilisation of the indicator fibre is effected in accordance with the invention by the provision of a planar repulsion surface with respect to which the fibre is supported in parallel spaced relationship for electrostatic deflection in a plane substantially at right angles thereto, the repulsion surface extending directionally lengthwise of the fibre to approximately its deflectable extremity and laterally at each side of the plane of deflection to define an area substantially as great as that embraced in any maximum deflection of the fibre out of that plane.

The scale preferably extends substantially in the plane of electrostatic deflection of the fibre and stabilisation of the fibre is assisted by the provision of an edge to the scale which is electrically connected to the internal wall of the casing and which has a curvature conforming to the arc of electrostatic deflection of the fibre extremity and is positioned beyond but closely adjacent to the arc of deflection. The electrical stability of the indicator fibre may be further improved by the provision opposite to the repulsion surface of a conducting guide surface which also is electrically connected to the internal wall of the casing and which has a curvature conforming substantially to the arc of electrostatic deflection of the fibre extremity and is positioned beyond but closely adjacent to the arc of deflection.

Figure 3:
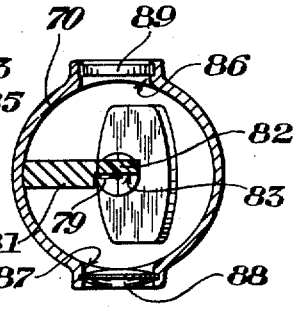
Figure 1:
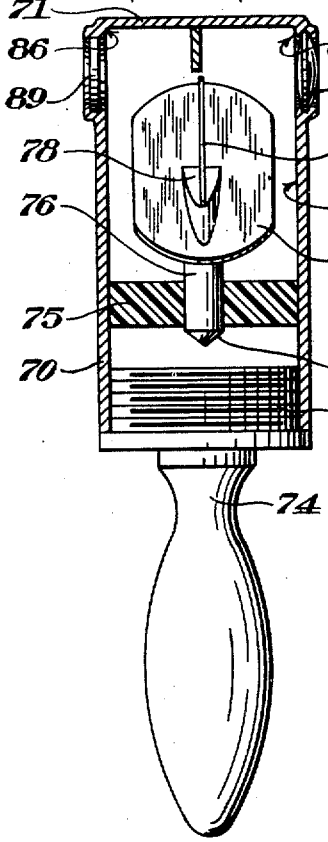
Figure 2:
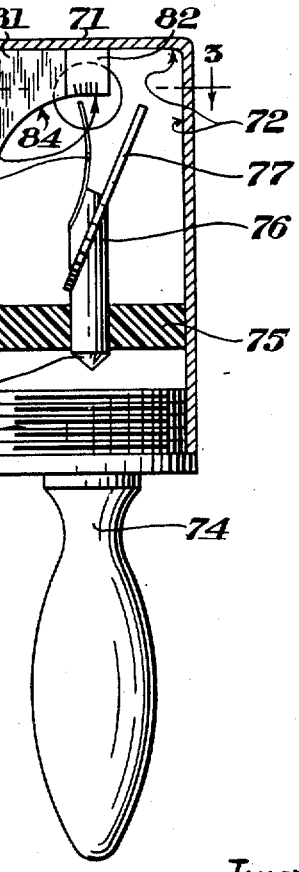

Specific embodiments of the invention will now be described, by way of example only, with reference to the accompanying drawings, in which:

Figure 1 is a view partly in side elevation and partly in diametral section of a first embodiment of the invention, Figure 2 is a part side elevation and part diametral section looking at right angles to Figure 1, Figure 3 is a horizontal section on the line 3—3 of Figure 2, Figure 4 is a detail of the image of the indicator fibre and scale as seen in the operation of the electroscope of Figures 1 to 4, Figure 5 is a perspective view looking into the interior of the outer casing of a second embodiment of the invention, Figure 6 is an exploded perspective view of certain components arranged to be contained within the casing of Figure 4, showing also a lid for the casing, Figure 7 is a sectional side view of the casing of Figure 5 with the assembled components of Figure 6 contained therein, the section being taken in a plane transverse to the casing containing the line 7—7 of Figure 5 looking in the direction of the arrows, and Figure 8 is a further sectional side view similar to Figure 7 but taken on the line 8—8 of Figure 5 looking in the direction of the arrows.

The electroscope shown in Figures 1, 2 and 3 includes a tubular casing 70 closed by an upper end 71, the casing and its end having an electrically conductive inner surface 72. The lower end of the casing is secured to a spigot portion 73 of a handle member 74, the casing 70 and spigot 73 being detachably engaged through corresponding screw threads.

An insulating disc 75 is secured transversely within the casing 70 above the spigot 73 and serves to provide a rigid insulating support for a cylindrical post 76 which extends axially within the casing through a central hole in the insulating disc. The post 76 also passes through an elliptical aperture in a flat repelling plate 77 which is secured in rigid engagement with and lies transversely to the post 76.

The post 76 and repelling plate 77 have electrically-conductive outer surfaces in electrical connection with each other and together constitute an ion-collector assembly which can be electrically charged relatively to the inner surface 72 of the casing. The conductive surface 72 of the casing embraces a chamber in which the ion-collector assembly is situated, which chamber may be ionised by radiation passing therethrough.

The end of the post 76 above the plate 77 is chamfered, as shown at 78, in a plane parallel with the plate 77 and a short indicator fibre 79, consisting of a fine, light-weight, elastic and electrically-conductive fibre is cemented, for example by an electrically-conducting shellac, to the chamfered end 78 so as to lie substantially parallel with and closely adjacent to the plate 77 in the uncharged condition of the electroscope and in the diametral plane of the casing which extends at right angles to the plate 77.

The indicator fibre 79 preferably consists of a short straight fibre of fused quartz, for example of about 3 to 4 microns diameter, which is gilded or platinised to make it conducting. Alternatively, an electrically conductive glass or metal fibre may be employed. The indicator 79 is connected electrically to the post 76 and accordingly shares any electrical charge imparted to the collector assembly. The collector may be charged by unscrewing the handle member 74 and by connecting a source of direct voltage between the conductive surface 72 of the casing 70 and an end 80 of the post 76 which protrudes through the insulator 75. When the collector and indicator are charged, the indicator is electrostatically repelled by and bends away from the plate 77, its position being dependent upon the voltage difference between the plate 77 and casing 70.

A thin, flat plate 81 is secured in a top corner of the casing between the tubular wall 70 and end 71 and extends radially part away across the casing in a plane substantially coinciding with the diametral plane of the casing at right angles to the plate 77, the indicator 79 also lying in that plane. A transparent element 82 of approximately half the width of the plate 81 is mounted at the end of the plate 81 and has a front surface 83 located in the diametral plane containing the indicator.

The surface 83 of the element 82 is provided with a suitably divided scale as shown in Figure 4, graduated, for example, in fractions of a Roentgen, for estimating the deflection of the indicator fibre and for thus indicating the total dosage of radiation or penetrating particles to which the ionisation chamber has been exposed. The plate 81 and element 82 terminate in contiguous edges 84 and 85, respectively, together constituting a smooth arcuate guide surface which conforms substantially in curvature with, extends closely adjacent to and lies beyond the arc followed by the end of the indicator fibre 79 in its electrostatic deflection away from the repelling plate 77. The arcuate edges 84 and 85 are electrically conductive and are connected electrically with each other and with the conducting surface 72. As will be understood from the foregoing, the edges 84 and 85 and the indicator 79 lie in a common diametral plane at right angles to the repelling plate 77 and the indicator deflects electrostatically in that plane.

At opposite sides of the top end of the casing 70 are provided circular openings 86 and 87 centred on a diameter of the casing at right angles to the plate 81. A short focus simple positive objective lens 88 is mounted within the opening 87 with its optical axis approximately coincident with the centre-line of the openings, and the transparent element 82 is arranged on the centre-line of the openings so that the edge 85 approximately coincides with the optical axis of the lens. A transparent window 89 is sealed within the opening 86 to admit external light into the casing.

The lens 88 is so selected that the surface 83 and the deflectable end of the indicator fibre 79 lie within its focal length and enlarged virtual images of the scale and indicator fibre may, therefore, be viewed through the lens against the illumination provided through the window 89.

As shown in Figure 1, the repelling plate 77 extends both lengthwise directionally of the indicator fibre 79 and directionally laterally thereof across a major part of the ionisation chamber to a substantial distance beyond each side of the indicator. It also extends beyond the fixed end of the indicator 79 for a substantial distance. The area of the plane surface of the plate 77 lying behind the indicator fibre is such that it is substantially co-extensive with the area which can be swept by the deflectable end of the indicator fibre in any movement in, or laterally out of the plane of electrostatic deflection such as may occur if the instrument is subjected to gross overcharging or to severe mechanical shock. Moreover, the surface 72 of the casing lies beyond the sweep of the indicator in any such possible deflection so that it is impossible for the indicator to adhere to the surface 72 under the most severe conditions of shock or over-charging.

The embodiment of the invention just described may be constructed as a very small compact instrument and the cylindrical construction is well adapted and convenient for fitting to the end of a pen, pencil or like holder in place of the handle shown.

The further embodiment of the invention shown in Figures 5 to 8 is designed to be worn upon the wrist and includes an outer casing 90 having the external shape of a wrist-watch, closed at its face by an integral front wall 91 (Figures 7 and 8) which lies transversely to an internal cylindrical wall surface 92 extending from the wall 91 to the back of the casing. The wall 91 is reduced in thickness over a segmental portion to provide an angular recess bounded by side surfaces 93 and 94, a flat forward surface 95 of the reduced wall 91, and a forward portion of a guide surface 97, comprising a smooth continuation of the surface 92, which guide surface extends to the bottom of the recess. The surfaces 93 and 94 merge smoothly into each other and into the surfaces 97 and 92 respectively as shown in Figure 5.

The guide surface 97 terminates in a shoulder 96 which juts out from the surface 92 next to the surface 94 and which extends from the forward surface 95 to almost the back of the casing. The guide surface 97 extends from the forward surface 95 to the outer end of the shoulder 96 and has a curvature which conforms substantially with the arc of electrostatic deflection of the deflectable end of an indicator fibre arranged within the casing 90 as will hereinafter appear.

A rectangular slot 98 extends through the side wall of the casing 90 from the back thereof to approximately half its depth, one wall of the slot being coincident with the ledge 96.

A prismatic optical system is received by the slot 98, the system comprising reflecting prisms 99 and 100 which are both integral with a light-transmitting bar portion 101. The prisms 99 and 100 and the bar portion 101 may be made of glass, but for large scale production a transparent plastic of high refractive index such as methyl methacrylate is preferably used. The prisms 99 and 100 project within the casing, the bar portion 101 being received within the slot 98 and terminating flush with the outer wall of the casing. The front prism 99 has a curved edge forming a continuation of the guide surface 97 and is provided with a stepped upper surface (Figures 5 and 7) comprising a planar surface 102 engraved with a scale and a lower surface 103 which is blackened. The rear prism 100 projects beyond the guide surface 97 and serves to direct light admitted from outside the casing through the bar portion 101 to provide background illumination for an electrically conductive indicator fibre 104 (Figure 7), similar in construction to the indicator 79 of the first embodiment of the invention, which is arranged within the casing with its free end close to the curved edge of the upper prism 98. The scale on the planar surface 102 of the prism 99 is likewise illuminated by light transmitted through the bar 101 and reflected by the prism towards the scale. The prismatic system is held in position by an element 105 fitted in tight engagement in the end of the slot 98 against the rear surface of the bar portion 101 or it can be cemented or waxed in position. It is important that the arcuate edge of the prism 99 adjacent to the indicator fibre should be electrically conducting. This condition can conveniently be achieved by the application of a very thin, semi-transparent, metal coating over the whole of the prisms 98, 99 and bar 100. Alternatively, a conducting material such as colloidal graphite can be painted along the edge of the prism 99 without obscuring the scale marking. The electrically conducting surface of the prism is electrically connected to the adjoining interior surface of the casing.

An aperture 106 is formed in the forward wall of the angular recess in axial alignment with the mid-point of the engraved edge of the prism 99 and a short focus positive objective lens 107 is secured within a recess in the outer surface of the end wall 91 concentric with the aperture 106. The distance between the objective lens 107 and the plane of the indicator 104 and the surface 102 carrying the scale is slightly less than the focal length of the lens so that upon peering closely into the lens upright considerably magnified virtual images of the scale and indicator fibre can be seen at a distance of approximately 25 cms. from the lens against a bright background illumination from the prisms 99 and 100. To minimise aberrational errors of the simple objective lens 107 its marginal area is preferably stopped-off, for example, by an opaque masking paint or by providing an apertured cap fitting over the lens with an extension secured in the aperture in the casing.

The internal surfaces of the casing 90 i. e., the surface 92, the side surfaces 93 and 94, the forward surface 95, the inner surface of the front wall 91, the shoulder 96 and guide surface 97 are all electrically conducting and electrically interconnected.

The ion-collector and indicator fibre assembly of the electroscope is shown in the exploded perspective view of Figure 6, in which figure the parts are shown as turned through 180° from the position they would occupy when assembled in the casing 90 in the position shown.

Referring to Figure 6, the casing 90 is closed by a disc-like lid 108 having a cylindrical wall 109 which extends around a major part of the periphery of the disc and interfits with the cylindrical wall surface 92 of the casing 90. A peripheral flange 110 of the lid 108 seats against the rear face of the casing. As shown in Figure 6, the lid 108 is reduced in thickness over a segmental portion to provide an angular recess bounded by transverse surfaces 111 and 112 and a flat inner surface 113. The recess in question corresponds in shape and position to the angular recess in the casing 90 bounded by the surfaces 93 and 94 and the inner surface 95. The surfaces 111 and 112 merge smoothly together and, in the angle embraced therebetween, the cylindrical wall 109 continues as a narrow wall 114 which interfits, in the region of the prismatic system and guide surface 97, with an interior cylindrical flange 115 (Figure 5) forming a continuation of the surface 92. The lid 108 is thereby rotatably interconnected with the casing and may be adjusted angularly with respect thereto, the amount of such angular adjustment being limited as will hereinafter appear. The side walls 109 and 114, the surfaces 111 and 112 together with the flange 115, the remaining interior surfaces of the lid and its back surface, are all electrically conducting and electrically interconnected. With the lid 108 fitted in the casing 90, the interior surfaces of the closed casing are thereby all electrically interconnected and enclose a conducting chamber which constitutes an ionisation chamber.

A charging contact is provided in the centre of the lid 108 by way of a metal press pin 117 mounted in gas-tight assembly with a resilient rubber bushing 18.

Threaded holes 119 and 120 extend part way through the lid 108 to receive screw-threaded bolts 121 and 122 respectively which serve to support an ion-collector assembly, designated by the general reference 123, in rigid but electrically insulated assembly with the lid. Thus, the collector 123 is supported from its rear face upon tubular spacing insulators 124 and 125 located next to the lid 103. The insulators 124 and 125 each receive in close fitting engagement a reduced extension 126 and 127 respectively, of tubular insulators 128 and 129 which respectively fit with lateral clearance within recesses 130 and 131 provided in opposite margins of the front face of the collector. The reduced extensions 126 and 127 also extend in close-fitting engagement through circular apertures 132 and 133 opening through the body of the collector 123 within the recesses 130 and 131 respectively. Washers 134 and 135 are positioned respectively over the insulators 128 and 129 beneath the heads of the bolts 121 and 122. The collector 123 can thereby be supported in rigid and insulated relationship with the lid 108 by passing the bolts 121 and 122 through a washer 134 or 135, an insulator 128 or 129 with its reduced extension fitted within the apertures 132 or 133, a spacing insulator 124 or 125, and by tightening the bolts in threaded engagement with the holes 119 and 120. The relative positions of the aforementioned parts when so assembled is shown in Figure 8 of the drawings.

The collector 123 consists of a solid disc truncated along a chord to provide flat co-planar end-surfaces 136 and 137 which extend inwards from opposite sides of the disc parallel with its central axis. The surface 136 extends to the diametral plane of the disc which lies at right angles thereto and the surface 137 terminates shortly within the margin of the disc as shown.

A flat repelling plate 138 integral with the collector disc is disposed between and below the surfaces 136 and 137 in plane parallel relationship therewith. The plate 138 extends laterally beyond each side of the collector disc for a distance equal to the width of the surfaces 136, 137 and at its ends also extends in underlapping relationship with the surfaces 136 and 137.

The indicator 104 is cemented, for example, by an electrically conducting shellac, in position on the surface 136 so as to lie substantially in the mid-bisecting-plane of the collector disc and in spaced parallel relationship with the repelling plate 138, the anchorage of the indicator extending to the inner end of the surface 136.

In the present embodiment of the invention, the collector disc includes a shallow circular recess 139 in its forward face to accommodate a small flat cylindrical condenser 140 the plates of which are brought out to connection tabs 141 and 142 at its opposite faces. With the condenser 140 positioned in the recess 139 the tab 141 makes contact with the bottom of the recess and when the collector assembly is positioned within the casing 90, as shown in Figure 8, the tab 142 makes contact with the inner surface of the front wall 91. The condenser 140 may, alternatively be omitted as well as the recess 139 in the collector.

The various external surfaces of the collector disc 123 and repelling plate 138 are also electrically conductive and interconnected and the indicator fibre 104 is secured to the surface 136 in electrical connection therewith to share any electrical charge imparted to the collector assembly and the condenser 140.

In the assembled instrument seen in Figure 8, the inner end of the metal press pin 117 falls short of but lies close to the rear surface of the collector disc 123. The collector and parts associated therewith may, therefore, be charged by connecting a battery between the casing 90 and the pin 117 and by depressing the pin in its resilient bushing 118 to make electrical contact with the surface of the collector.

The assembled relationship of the ion-collector 123 and its associated parts with the casing 90 and lid 108 is such that the angular recesses in the casing and lid face each other and together define an ionization cavity of angular shape bounded outwardly by the surface 92, the ledge 96 and the guide surface 97 and inwardly by the surface 94 of the casing, the corresponding surface 112 of the lid, and by the surface 93 and corresponding surface 111. The forward face of the collector disc does not touch the inner surface of the front wall 91, being spaced therefrom by the condenser 140 and, likewise, the rear face of the collector disc is supported out of contact with the lid 108 and the diameter of the collector disc is also slightly less than the internal diameter of the casing. Accordingly, the collector disc is spaced on all sides from the interior of the casing 90 so providing an ionization cavity surrounding the disc which communicates with the angular ionisation cavity aforesaid.

Portable dosimeters may be subjected to all kinds of rough usage and it is therefore important that the indicator fibre should not be able to touch and, possibly, adhere to any of the surrounding surfaces of the electroscope under varying conditions of usage. The instrument should also be capable of withstanding a large over-voltage, of being dropped and of being spun violently, all without detriment to the indicator from electric forces, shock, centrifugal forces or from circulation of air within the casing. In the present embodiment of the invention, a high degree of stabilization of the indicator has been achieved. Thus, with the parts assembled as shown in Figures 7 and 8, the repelling plate 138 lies athwart the angular cavity with its lateral extensions lying closely to the surfaces 94 and 112 in overlapping relationship therewith. The sides of the plate 138 also extend closely adjacent to the forward surface 95 of the casing and the surface 113 of the lid but the surfaces 95 and 113 and the prism 100 nevertheless lie beyond the sweep of the end of the indicator in any deflection laterally across the repelling plate up to an angle of approximately 90° to each side of its mean position.

Electrostatic deflection of the indicator 104 takes place in the mid-plane of the collector disc at right angles to the repelling plate 138 and in the plane of the surface 102 of the prism 99. The indicator 104 is of such length as to extend almost to the edge of the prism 99 and deflects away from the plate 138 in the direction of the guide surface 97. As previously stated, the edge of the prism 99 and the surface 97 conform substantially in curvature with the arc of electrostatic deflection of the indicator 104. The edge of the prism 99 and the guide surface 97 also lie beyond but closely adjacent to the arc of deflection of the free end of the indicator and the end of the indicator cannot, therefore, make contact with the prism or surface 97 even under severe conditions of overcharging. The movement of the indicator fibre 104 is thus controlled not only by electrostatic repulsion from the repelling plate 138 but by electrostatic attraction towards the guide surface 97 and the adjoining conducting edge of the prism 99. The attractive force is exerted longitudinally of the fibre so tending to maintain it in a plane at right angles to the repelling plate.

The extensive area of the repelling plate 138 in relation to any possible deflection of the indicator fibre 104 is of considerable importance in obtaining stable operation of the fibre under conditions of severe mechanical shock. The precise action of the plate 138 in stabilising the indicator is not accurately known, but may conveniently be explained on the basis that in any lateral deflection of the indicator through a substantial angle out of its plane of electrostatic deflection, the indicator lies in a more-or-less uniform field extending between the plate 138 and the wall portion 97. This field does not tend further to deflect the indicator laterally but instead allows the restoring force arising in the resilient indicator upon its lateral deflection to have free play in returning it to its plane of electrostatic deflection. The stable action of the indicator is, of course, also greatly assisted by the fact that the surfaces of the angular cavity in which it is contained lie beyond the reach of the end of the indicator under the most severe displacements, arising from mechanical shock or overcharging, likely to be encountered in practice.

The ohmic value of the insulation resistance of the spacing insulators 124 and 125 and of the tubular insulators 128, 129 (and of the insulator 75 of Figures 1 and 2) must be extremely high, preferably of the order of $10^{20}$ ohms to avoid false indications by the indicator fibre consequent upon leakage of electrostatic charge from the collector to the casing.

The required insulation can be obtained by making the insulator 75 of Figures 1 and 2, and the parts 124, 125, 128 and 129 of the second embodiment of the invention, of polystyrene which has been moulded under high pressure and formed with a highly polished surface. The cleanliness of these insulating parts is an important factor in securing the required electrostatic insulation and it should be noted that such parts if touched by hand are useless for the purpose of the invention. The foregoing constructions permit the use of insulating members of low surface area and volume thereby minimizing electrostatic polarization of the insulators which would otherwise interfere with the operation of the electroscope.

In the assembled instrument the repelling plate 138 lies between and in overlapping relationship with the surface 94 on the one hand and the prisms 99 and 100 on the other hand. Rotational adjustment of the lid 108 and the collector assembly with respect to the casing is thereby limited in extent but the limited angular adjustment so afforded is important in permitting the indicator fibre to be set to a predetermined position with respect to the scale in initial factory adjustment. To adjust the setting of the indicator fibre it is merely necessary slightly to rotate the lid 108 with respect to the casing 90 to bring the deflectable extremity of the indicator fibre to a zero position on the scale for a fixed charging voltage of, say, 100 volts. This feature is valuable in enabling manufacturing tolerance to be taken up so permitting all electroscopes of a production line to have similar electrical characteristics.

The electroscope should be assembled in a very dry atmosphere so that the moisture content of the air enclosed in the ionisation chamber is low. After the final adjustment of zero has been made by rotating the lid 108, the latter is then cemented in position hermetically to seal the instrument.

The conducting cement used to secure the fibres 79 and 104 to their supports may conveniently consist of a hardening plastic containing a conducting medium, such as finely divided graphite. Alternatively, the conducting cements available under the proprietary names "Logoquant," "Zapon" and "Rubiat" are satisfactory. It should be noted that the cement should not contract appreciably upon solidifying because this may pull upon and break the gold or other conducting coating on the fibre so rendering it non-conducting and useless. Instead of using a conducting cement, a non-conducting cement, such as shellac, may be employed and the cemented parts sputtered with gold or other metal to ensure electrical continuity between the indicator fibre and its support.

The electroscope of Figures 5 to 8 may be worn upon the wrist and, when so worn, the construction permits the indicator fibre and scale to be viewed through the objective lens without obstructing the admission of external light into the casing since the prismatic optical system is arranged to direct light towards the lens from the side of the casing. The readings obtained with the instruments described may not be accurate enough for radiation therapy, but they are sufficiently accurate for health protection which is the primary purpose for which the instruments were designed.

The electroscopes herein described involve relatively few component parts and present little difficulty in manufacture, assembly and adjustment. Straight uniform quartz fibre can be made in unlimited quantity with a diameter guaranteed within a few percent, and the overall cost of the instruments depends chiefly upon the case and reproducibility with which the indicator fibre can be installed. To produce instruments with uniform characteristics care should be taken to affix the indicator fibre in correct parallel alignment with the repelling plate and to ensure that the indicator fibres are cut off to a constant length.

The electroscopes of Figures 1 to 8 are prototype designs intended for fabrication in metal. In mass-production, the instruments could be made by the well-known metal die-casting technique or, alternatively, plastic moulding (preferably injection moulding) could be used for a large proportion of the parts, the design of the parts illustrated being modified as may be necessary to suit the die-casting or moulding procedure employed. If the instruments are made of metal, the metal should have a low atomic number and aluminium and magnesium or alloys thereof are particularly suitable. When using plastic mouldings, the required electrical conductivity can be obtained where necessary by means of conductive coatings applied to the mouldings; good electrical conductivity is not essential and the resistance of the casing or collector disc may, for example, be of the order of megohms.

Alternatively, electroscopes in accordance with the invention may be made of graphite. For fast neutron dosimetry it is advantageous to fabricate the instrument from a conducting material containing the same proportion of hydrogen as in the tissue to be treated such, for example, as polythene (i. e. polymerized ethylene) with an appropriate loading of graphite or carbon black.

The electroscopes described may also be made sensitive to beta radiation by constructing the casing with a wall portion made of a material, such as thin aluminium, magnesium or plastic, which admits beta particles. Thus, the end wall 71 of the first embodiment of the invention may be so constructed. Likewise, the lid 108 of the second embodiment may be constituted a diaphragm of such material to provide a large area through which beta rays may enter. With such an arrangement beta radiation will not be indicated when the instrument is worn with the lid next to the wrist but, upon turning the instrument over to expose the diaphragm, will enter the ionisation cavity and be added to the effect of the gamma radiation. Persons handling small radio active objects should, of course, wear the electroscope on the inner side of the wrist.

The electroscopes may be made sensitive to slow neutrons by including an appropriate amount of a boron compound, such as amorphous boron or boron carbide inside the casing. While specific embodiments of the invention have been described which are designed primarily as small light-weight instruments for personnel wear, it should be understood that the several features of the invention are also applicable to laboratory electroscopes and facilitate the manufacture and adjustment of such instruments.

Since many changes could be made in the above constructions and many apparently widely different embodiments of this invention could be made without departing from the scope thereof, it is intended that all matter contained in the above description or shown in the accompanying drawings shall be interpreted as illustrative and not in a limiting sense. Thus, for example, it is within the scope of the invention to invert the functions of the internal wall of the casing and the repulsion member with respect to the fibre. To this end, the indicator fibre may be supported adjacent to and in electrical connection with a conducting repulsion surface forming part of the internal conducting wall of the casing which surface has characteristics of shape and area as previously described with reference to the members 77 or 138. A curved conducting guide surface, similar to that of the surfaces 84 or 97 previously described, is then provided on the collector so as to lie beyond but closely adjacent to and to conform substantially to the arc swept by the fibre extremity in deflecting away from the repulsion surface of the casing, the arrangement being such that the fibre cannot touch anything except the repulsion surface of the casing.

What we claim as our invention is:

1. An electroscope comprising, in combination, a casing having an internal conducting surface, a member having a conducting surface mounted within the casing in insulated relationship thereto, a flexible conducting indicator fibre disposed adjacent to one of said surfaces in electrical connection therewith, said fibre having an extremity capable of angular electrostatic deflection in an electrostatic field between said surfaces, a scale within said casing carried adjacent to and in the plane of the deflectable extremity of said fibre in measuring relationship to angular deflection thereof, the edge of the scale adjacent to said fibre being conductive and in electrical connection with the conducting surface of said casing, an objective lens supported from an aperture in said casing in image-forming relationship to and spaced from the deflectable extremity of said fibre and said scale by an optical distance less than its focal length, and means for illuminating said fibre and scale by light external to said casing whereby enlarged virtual images thereof may be viewed at said lens.

2. An electroscope comprising, in combination, a casing having a conducting internal wall, a conducting repulsion member mounted within the casing in insulated relationship thereto, a flexible conducting indicator fiber disposed adjacent to said member in electrical connection therewith, said fibre having an extremity capable of angular electrostatic deflection in an electrostatic field between said member and said wall, a scale within said casing carried adjacent to the deflectable extremity of said fibre in measuring relationship to angular deflection thereof, the edge of the scale adjacent to said fibre being conductive and in electrical connection with the conducting wall of said casing, an objective lens supported from an aperture in said casing in image-forming relationship to and spaced from the deflectable extremity of said fibre and said scale by an optical distance less than its focal length, and means for illuminating said fibre and scale by light external to said casing whereby enlarged virtual images thereof may be viewed at said lens.

3. An electroscope as claimed in claim 2, including a window in said casing on the optical axis of said lens, said scale and fibre being arranged between said window and lens for trans-illumination from said window.

4. An electroscope as claimed in claim 2, including a window in said casing out of alignment with the optical axis of said lens, a reflecting prismatic optical system within said casing in the field of view of said lens, said system including a prismatic element upon which said scale is carried immediately adjacent to the deflectable extremity of said fibre for trans-illumination by said element by light received from said window.

5. An electroscope as claimed in claim 2, said scale extending substantially in a plane, said fibre being arranged for electrostatic deflection of its extremity in the said plane and means for varying the relative positions of said scale and fibre in said plane in a zero adjustment of the instrument.

6. An electroscope as claimed in claim 2, said repulsion member comprising a planar surface, means supporting said fibre in parallel spaced relationship to said surface for electrostatic deflection in a plane substantially at right angles thereto, said surface extending directionally lengthwise of said fibre to the deflectable extremity thereof and extending laterally for a substantial distance at each side of said plane of deflection to provide a surface area substantially as great as that swept by said fibre in any deflection out of said plane.

7. An electroscope as claimed in claim 6, said scale extending substantially in the plane of electrostatic deflection of said fibre and having the curved conducting edge thereof conform substantially in curvature with and extend closely adjacent to the arc swept by said fibre extremity in said plane.

8. An electroscope as claimed in claim 7, including means for varying the position of said fibre and repulsion surface with respect to said scale in a zero adjustment of the instrument.

9. An electroscope as claimed in claim 2, said repulsion member comprising a planar surface, means supporting said fibre in parallel spaced relationship to said surface for electrostatic deflection in a plane substantially at right angles thereto, said scale extending substantially in said plane of electrostatic deflection and having the curved conducting edge thereof conform substantially in curvature with and extend closely adjacent to the arc swept by said fibre extremity in said plane and means for varying the position of said fibre and repulsion surface with respect to said scale in zero adjustment of the instrument.

10. An electroscope as claimed in claim 2 including, a window in said casing out of alignment with the optical axis of said lens, a reflecting prismatic optical system within said casing in the field of view of said lens, means supporting said fibre for electrostatic deflection in a plane transverse to said optical axis, said optical system having a first prismatic element carrying said scale substantially in said plane of electrostatic deflection and a second prismatic element removed further from said lens than said fibre, said elements being arranged to trans-illuminate said scale and fibre respectively by light received from said window, and means for varying the position of said fibre with respect to said scale in a zero adjustment of the instrument.

11. An electroscope as claimed in claim 2 including, a window in said casing out of alignment with the optical axis of said lens, a reflecting optical system within said casing arranged to trans-illuminate the deflectable portion of said fibre and said scale by light received from said window, said repulsion member comprising a planar surface extending substantially parallel with said optical axis, means supporting said fibre in parallel spaced relationship to said surface for electrostatic deflection in a plane substantially at right angles thereto, said surface extending directionally lengthwise of said fibre to the deflectable extremity thereof and extending laterally for a substantial distance at each side of said plane of deflection to provide a surface area substantially as great as that swept by said fibre in any deflection out of said plane, said scale extending substantially in said plane of electrostatic deflection, and having the curved conducting edge thereof conform substantially in curvature with and extend closely adjacent to the arc swept by said fibre extremity in said plane, and means for conjointly varying the position of said fibre and repulsion surface with respect to said scale in zero adjustment of the instrument.

12. An electroscope comprising, in combination, a casing constituted by a body portion and a lid interconnected therewith for rotational adjustment with respect thereto, said body portion and lid enclosing a shallow substantially cylindrical ionisation chamber having a conducting internal wall; said chamber containing (1) an ion collector member supported through electrical insulation from said lid in spaced relationship to said internal wall, said collector having a conducting surface and including a planar repulsion surface, (2) a flexible conducting indicator fibre supported from said collector adjacent to and in electrical connection with said repulsion surface, said fibre having an extremity capable of angular electrostatic deflection in an electrostatic field between said repulsion surface and conducting wall, (3) a scale supported from said body portion adjacent to the deflectable extremity thereof, said repulsion surface and fibre being conjointly adjustable with respect to said scale by rotational adjustment of said lid with respect to said body portion and (4) an optical system for illuminating said fibre and scale by light external to said casing; an objective lens supported from an aperture in said body portion in image-forming relationship to and spaced from the deflectable extremity of said fibre and scale by an optical distance less than its focal length; a window in said body portion arranged to admit external light to said optical system, and means for connecting said collector to a source of charging potential.

13. An electroscope as claimed in claim 12, the internal wall of said body portion including a curved guide surface lying closely adjacent to and conforming substantially to the arc swept by said fibre extremity.

14. An electroscope as claimed in claim 12, said window comprising an opening through a wall of said casing removed from the optical axis of said lens, and said optical system including a pair of prismatic elements integral with a light-transmitting member received within said opening, said elements being arranged to direct light transmitted through said member towards said lens, said scale being carried by a first of said elements in a plane substantially at right angles to said repulsion surface and substantially coincident with the arc of electrostatic deflection of said fibre and the second of said elements being removed further from said lens than said fibre, whereby said scale and fibre are trans-illuminated by said elements.

15. An electroscope as claimed in claim 14, said first prismatic element terminating in a curved edge extending closely adjacent to and having a curvature conforming substantially with the arc swept by said fibre extremity, said edge being conducting and in electrical connection with the internal wall of said casing.

References Cited in the file of this patent or the original patent

UNITED STATES PATENTS

| | | |
|---|---|---|
| 1,446,748 | Johnsen et al. | Feb. 27, 1923 |
| 1,855,669 | Glasser | Apr. 26, 1932 |
| 2,022,117 | Lauritsen | Nov. 26, 1935 |
| 2,168,464 | Yeda | Aug. 8, 1939 |
| 2,465,886 | Landsverk et al. | Mar. 29, 1949 |

OTHER REFERENCES

Gamma Ray Pocket Survey Meter, Landsverk MDDC, 952, August 22, 1945, pages 1–10.